(12) United States Patent
Chen et al.

(10) Patent No.: US 9,507,385 B2
(45) Date of Patent: Nov. 29, 2016

(54) PORTABLE INFORMATION HANDLING SYSTEM KEYBOARD SUPPORT ASSEMBLY

(71) Applicant: Dell Products L.P., Round Rock, TX (US)

(72) Inventors: Chung-Jen Chen, Taipei (TW); Wen-Pin Huang, New Taipei (TW); Chih-Hao Chen, New Taipei (TW); Chin-Chih Lin, Taipei (TW); Jia Hong Shih, Taipei (TW); Maria Carmen Schlesener, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/619,355

(22) Filed: Feb. 11, 2015

(65) Prior Publication Data

US 2016/0231788 A1 Aug. 11, 2016

(51) Int. Cl.
*G06F 17/00* (2006.01)
*G06F 1/16* (2006.01)

(52) U.S. Cl.
CPC .................. *G06F 1/1669* (2013.01)

(58) Field of Classification Search
USPC ............................................ 235/375, 145 R
See application file for complete search history.

(56) References Cited

U.S. PATENT DOCUMENTS

| 8,811,003 | B1* | 8/2014 | Hayashida | G06F 1/1662 |
| | | | | 361/679.08 |
| 2007/0199804 | A1* | 8/2007 | Joseph | H01H 13/705 |
| | | | | 200/5 A |
| 2008/0174951 | A1* | 7/2008 | Mundt | G06F 1/1616 |
| | | | | 361/679.41 |
| 2012/0050077 | A1* | 3/2012 | Shih | H01H 13/06 |
| | | | | 341/22 |
| 2014/0139989 | A1* | 5/2014 | Mori | G06F 1/1628 |
| | | | | 361/679.09 |
| 2015/0077341 | A1* | 3/2015 | Hood, III | G06F 3/02 |
| | | | | 345/168 |
| 2015/0092332 | A1* | 4/2015 | Yu | G06F 1/1601 |
| | | | | 361/679.09 |
| 2015/0185869 | A1* | 7/2015 | Chng | G06F 1/1662 |
| | | | | 345/168 |
| 2015/0332874 | A1* | 11/2015 | Brock | H01H 13/023 |
| | | | | 200/5 A |

* cited by examiner

*Primary Examiner* — Edwyn Labaze
(74) *Attorney, Agent, or Firm* — Terrile, Cannatti, Chambers & Holland, LLP; Robert W. Holland

(57) ABSTRACT

A portable information handling system keyboard rests on a support surface of a housing with securing actions taken from above the housing, such as by screws that insert through the keyboard and then into the housing. A lattice cover having key openings fits over the keyboard to align adapters of its bottom surface with posts extending from the support surface through openings formed in the keyboard. The adapters snap to the posts to couple the cover against the keyboard so that the cover bottom surface presses the keyboard against the information handling systems upper support surface.

19 Claims, 5 Drawing Sheets

PORTABLE INFORMATION HANDLING SYSTEM KEYBOARD SUPPORT ASSEMBLY

BACKGROUND OF THE INVENTION

1. Field of the Invention

The present invention relates in general to the field of information handling system input devices, and more particularly to a portable information handling system keyboard support assembly.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems typically include integrated input devices, such as integrated keyboards. For example, clamshell and convertible portable information handling systems typically have a base that integrates a keyboard and rotationally couples with a lid that integrates a display. The clamshell configuration opens to hold the display roughly perpendicular to the keyboard so that an end user can make inputs to the keyboard while viewing the display. The convertible configuration typically includes rotational coupling that allows 360 degrees of motion of the display so that the base and lid configure both as a clamshell and as a tablet having the display exposed for touch inputs. In some instances, the lid with the integrated display detaches from the base and keyboard for use as a tablet separate from the base.

In any portable information handling system that integrates a keyboard, decreased thickness (or z dimension) of the base is typically a design goal. Other design goals include ease of manufacture and reliability in use. Since portable information handling systems tend to have minimal structure by design, manipulation of individual components during manufacture tends to present difficulty. Further, deflection of the keyboard relative to the base may cause end users to question the strength of the design even if reliability issues do not arise. In many instances, a common keyboard part is used in multiple information handling systems of different sizes so that the keyboard drives electrical and mechanical design considerations to force the component to fit.

One conventional manner of keyboard placement in a portable base is to metal peg standoffs underneath the keyboard to support the keyboard. The use of metal pegs tends to require a path through the system motherboard that disrupts processing component placement and adds to mechanical design complexity. Metal peg standoffs add to the cost of systems as well as the complexity of assembly and of maintaining an inventory for building systems. In addition, assembly of the information handling system with the metal peg standoffs usually includes inverted assembly steps with screws that insert through a portion of the keyboard from the bottom of the base. These assembly steps add to the cost and complexity of manufacture as well the difficulty of repair or replacement of a keyboard after a portable information handling system ships.

SUMMARY OF THE INVENTION

Therefore, a need has arisen for a system and method which assembles a keyboard to a portable information handling system in a robust and direct manner.

In accordance with the present invention, a system and method are provided which substantially reduce the disadvantages and problems associated with previous methods and systems for assembly of a keyboard to a portable information handling system. A keyboard couples to a portable information handling system upper surface at least in part with a cover that attaches over the keyboard to connecting devices beneath the keyboard.

More specifically, a portable information handling system processes information with processing components disposed in a housing, such as a CPU, RAM and embedded controller that coordinates inputs made through an integrated keyboard. A keyboard assembly couples to an upper surface of the information handling system housing with an assembly process accomplished from above the housing. For example, the keyboard couples to an upper surface of the housing with screws inserted from the keyboard upper surface into the keyboard and then into the housing. The keyboard includes openings that allow connector posts to extend upwards from the keyboard support surface. A lattice cover is placed over the keyboard to couple with the connector posts and thus hold the keyboard against the keyboard surface while hiding from end user sight the connection mechanism. Connectors and snaps located around the perimeter of the keyboard maintain the lattice cover in position securely fastened against the housing upper surface. An end user removes the keyboard by pulling the lattice cover free from the connector posts and rim snaps so that screws holding the keyboard in place are accessible for removal.

The present invention provides a number of important technical advantages. One example of an important technical advantage is that a keyboard assembles to a portable information handling system securely from an upper position that has reduced impact on the electrical and mechanical component design. The keyboard gets support from the base upper surface so that manufacture assembly may be performed separate from the base and electronic components. The elimination of metal peg standoffs or other supporting structures that hold the keyboard reduces costs and manufacture complexity. In addition, end users may perform repair or replacement of a keyboard without exposing sensitive electronic components, such as the motherboard and processing components. The same keyboard and support configuration readily adapts across different portable information handling system designs and platforms.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A portable information handling system keyboard rests securely on an upper surface of a housing coupled in place at least in part by a lattice cover that engages posts extending upwards from the housing upper surface. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
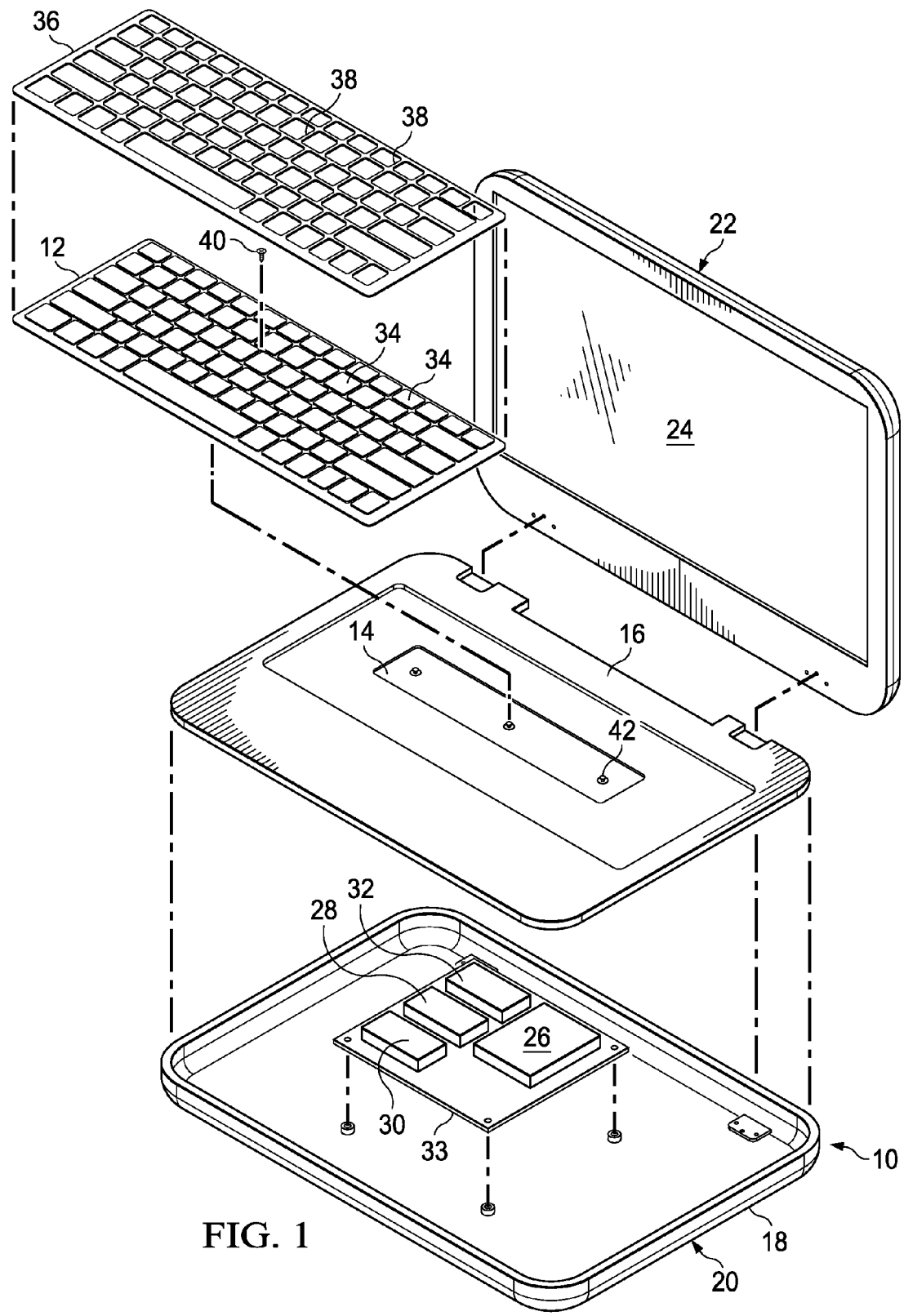
FIG. 1 depicts a blown-up view of an information handling system having a keyboard installed at an upper support surface.

Referring now to FIG. 1, a blown-up view depicts an information handling system 10 having a keyboard 12 installed at an upper support surface 14. Upper support surface 14 is, for example, an indented portion pressed into a metal portion and coupled with upper palm rest surface 16 that fits on a base 18 to define a housing 20. In various embodiments, upper palm rest surface 16 is a metal, plastic or other type of material integrated with or otherwise coupled to upper support surface 14. Housing 20 contains processing components that process information and also rotationally couple with a lid 22 having an integrated display 24 that presents information as visual images. For example, a central processing unit (CPU) 26, random access memory (RAM) 28, chipset 30 and embedded controller 32 installed on a motherboard 33 cooperate to process information for presentation on display 24. In alternative embodiments, the processing components may be built into lid 22, such as in a tablet configuration, with base 18 providing support for keyboard 12.

Embedded controller 32 interfaces with keyboard 12 to accept end user keyed inputs and code the inputs for use by CPU 26. Keyboard 12 includes a plurality of keys 34 that accept end user inputs, such as with a QWERTY configuration. A lattice cover 36 fits over top of keyboard 12 with key openings 38 that allow keys 34 to pass through. Screws 40 or other suitable couple devices insert from the top of keyboard 12 and into openings formed in keyboard support surface 14 to secure keyboard 12 robustly into a position on top of upper surface 16 of housing 20. In one embodiment, screws 40 attach to support surface 14 and to a separate palm rest 44 with insert structures that provide simplified assembly without passing through motherboard 33 and bottom housing 20, thus saving space on motherboard 33. Lattice cover 36 fits over top of keyboard 12 to cover screws 40 from sight by an end user. Lattice cover 36 includes adapters on its bottom side that fit through openings of keyboard 12 and then couple to connector posts 42 that are couple to or integrated with keyboard support surface 14. Lattice cover 36 helps to keep keyboard 12 in position while allowing assembly of keyboard 12 from an upper position over the top of information handling system 10 without turning information handling system 10 upside down to insert screws or other coupling devices from below keyboard 12. Since keyboard 12 firmly rests on top of keyboard support surface 14, an end user experiences a robust and well supported keyboard during normal use.

Figure 2:
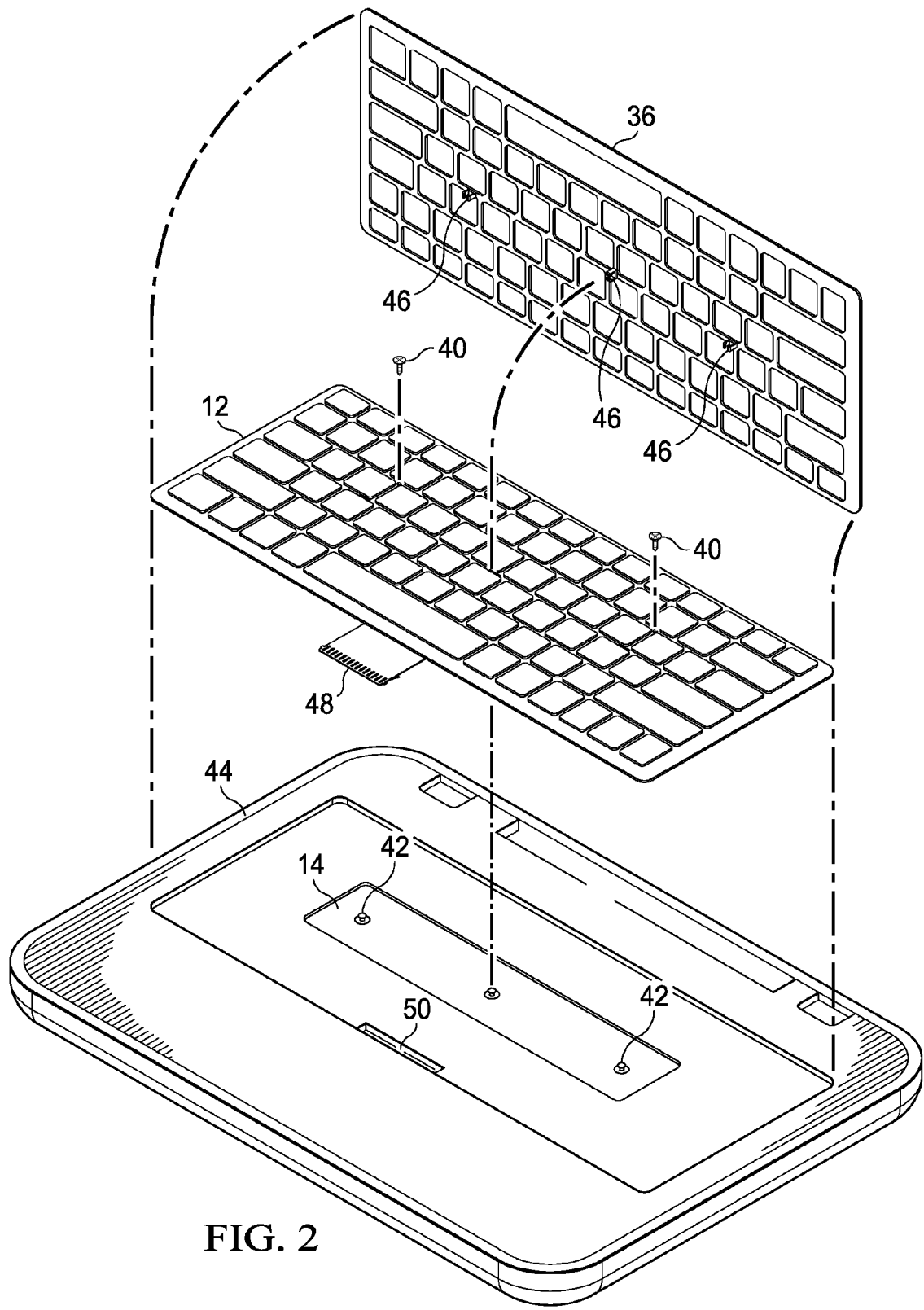
FIG. 2 depicts a side blown-up view of a keyboard and lattice cover aligned for assembly to a support surface.

Referring now to FIG. 2, a side blown-up view depicts a keyboard 12 and lattice cover 36 aligned for assembly to a support surface 14. Support surface 14 has an indented surface defined along an outer perimeter by a rim 44, along which snap connectors 46 are disposed to interact with snaps of lattice cover 36. Connector posts 42 extend upward from support surface 14 within the perimeter of rim 44 and align with holes formed in keyboard 12. The keyboard is assembled to housing 20 by placing keyboard 12 on support surface 14 to insert connector posts 42 into openings of keyboard 12. Screws 40 are inserted into openings of keyboard 12 and then attached to housing 20 so that keyboard 12 is affixed to housing 20. Once keyboard 12 is affixed to housing 20, lattice cover 36 is placed over keyboard 12 to fit keys 34 through key openings 38, and adapters on the bottom surface of lattice cover 36 snap onto connector posts 42. Snaps along the outer perimeter of keyboard 12 couple with snap connectors 46 along rim 44 to hold lattice cover 36 in place. A keyboard cable 48 extends from keyboard 12 and through a cable opening 50 to interface with a cable connector. For example, cable opening 50 leads to a keyboard connector disposed in a bottom surface of housing 20 accessible to an end user, such as a connector under a battery coupled to the bottom of housing 20. Alternatively, the connector is on the motherboard top surface so the cable runs internally to secure the connection from the keyboard rather than to a position underneath the battery.

Figure 3:
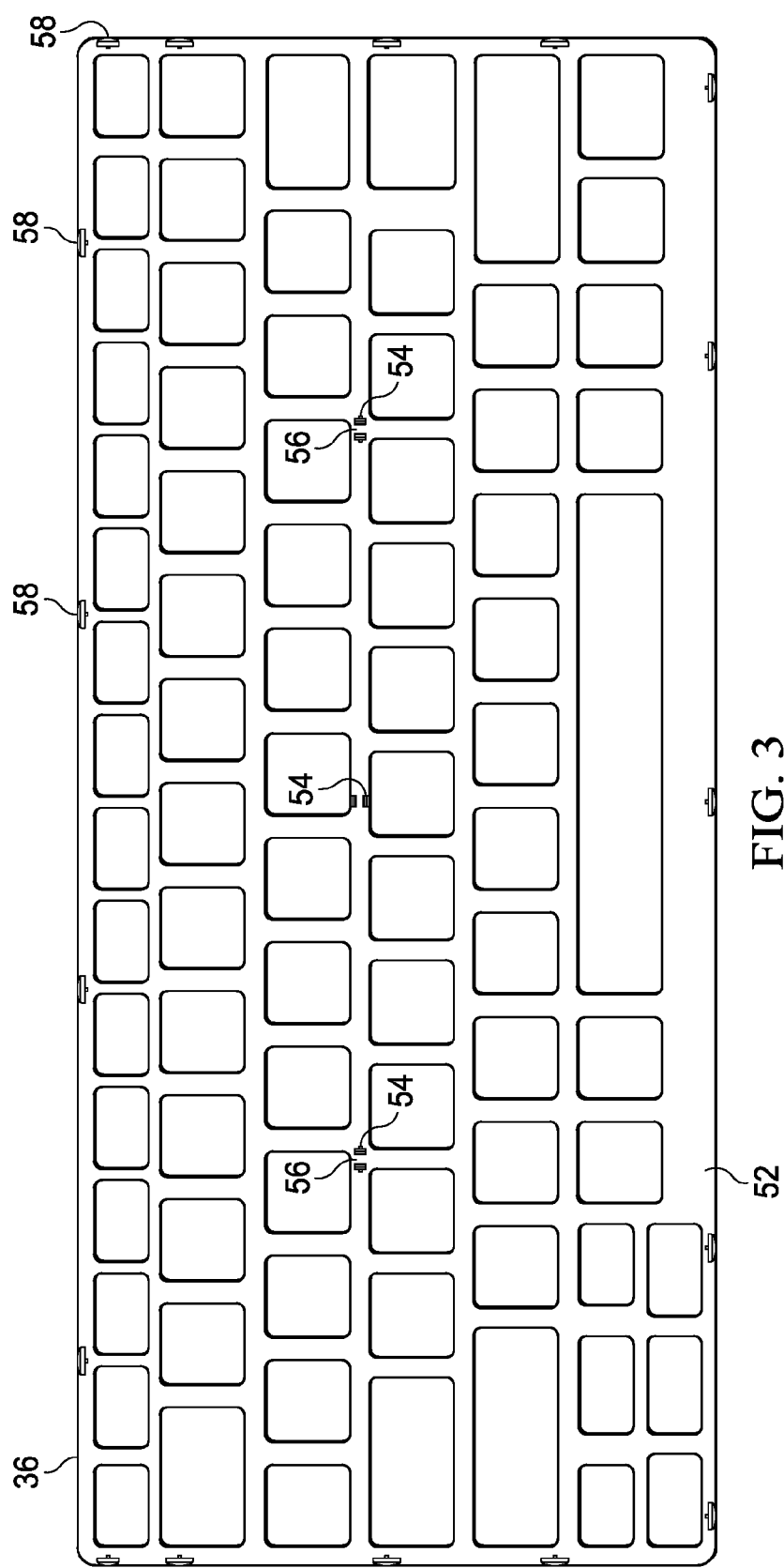
FIG. 3 depicts a bottom view of a lattice cover having snap connectors disposed on the bottom surface to couple with a keyboard support surface.

Referring now to FIG. 3, a bottom view of lattice cover 36 depicts snap connectors disposed on the bottom surface 52 to couple with a keyboard support surface 14. Adapters 54 align to couple with connection posts of the keyboard support surface. In the example embodiment, each adapter 54 is a pair of parallel snap protrusions 56 spaced to snap over a connector post. The parallel spaced protrusions 56 have a lateral alignment and a longitudinal alignment to aid in maintaining the position of lattice cover 36 along both axes. Snaps 58 along outer perimeter of lattice cover 36 align to couple with snap connectors formed in rim 44 of support surface 14. To assemble lattice cover 36, the end user places snap protrusions 56 and snaps 58 in alignment with posts and connectors of the keyboard support surface and presses down to engage the snaps and connectors. To disassemble lattice cover 36, an end user pulls lattice cover 36 free to release the snaps and connectors and then lifts lattice cover 36 free to expose keyboard 12 beneath. In one embodiment, one or more slot openings are formed along the edge of lattice cover 36 so that an end user may insert a flat edge tool, such as a standard screw driver, under lattice cover 36 and against keyboard support surface 14 to pry upwards on lattice cover 36, thus aiding the release of the snaps and connectors.

Figure 4:
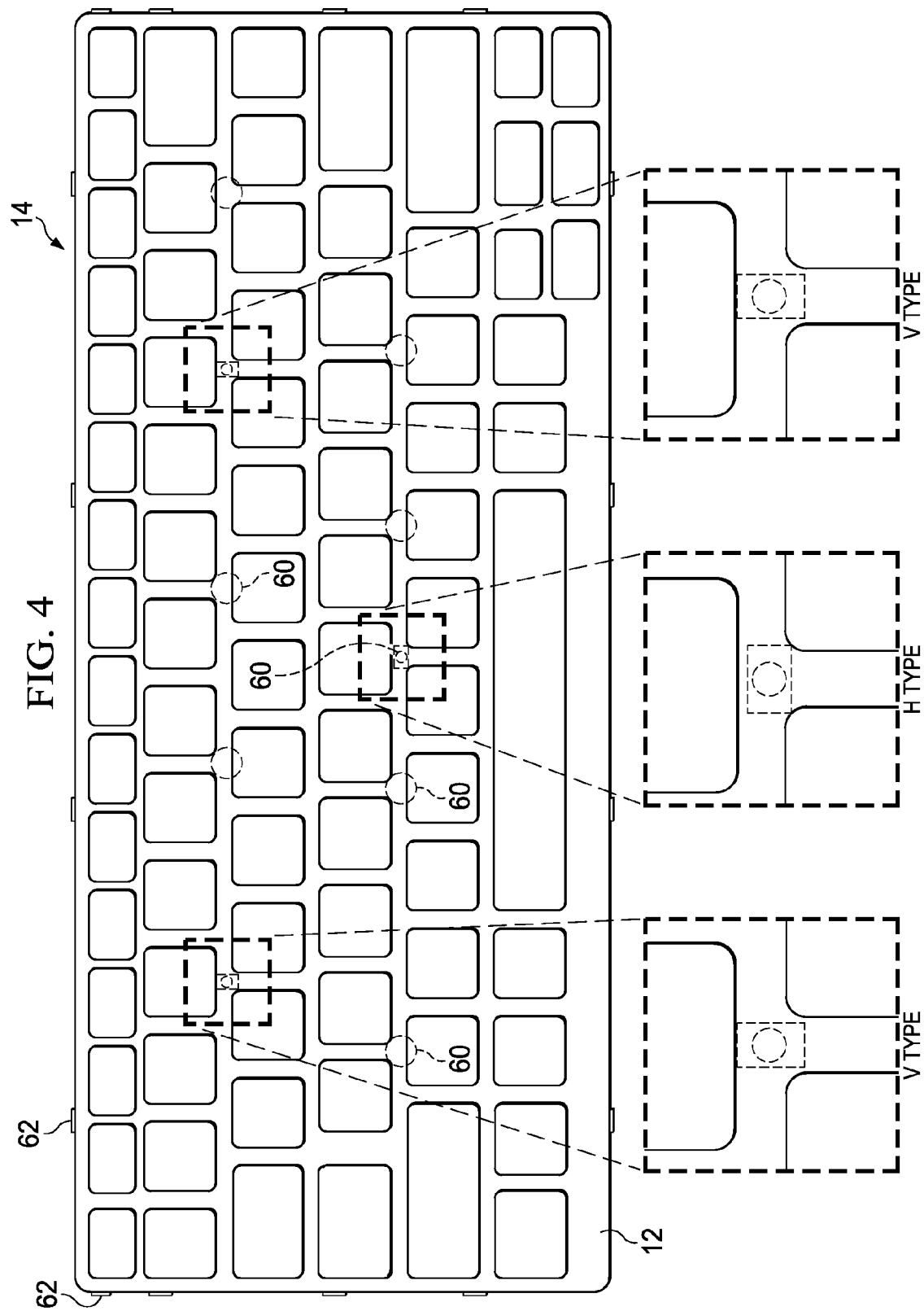
FIG. 4 depicts a top view of keyboard openings formed to allow connector posts and screws to pass through the keyboard.

Referring now to FIG. 4, a top view of keyboard 12 depicts openings 60 to allow connector posts and screws to pass through keyboard 12. Keyboard 12, for example includes equally spaced openings placed between keys where a lattice cover 36 will cover the openings 60 when installation is complete. More openings 60 are made available than may be needed for a particular assembly so that a keyboard 12 readily adapts to a variety of different sized information handling systems. Additional openings 62 formed in upper surface 14 along the outer perimeter of keyboard 12 align to accept snaps that extend downward from the lower surface of lattice cover 36.

Figure 5:
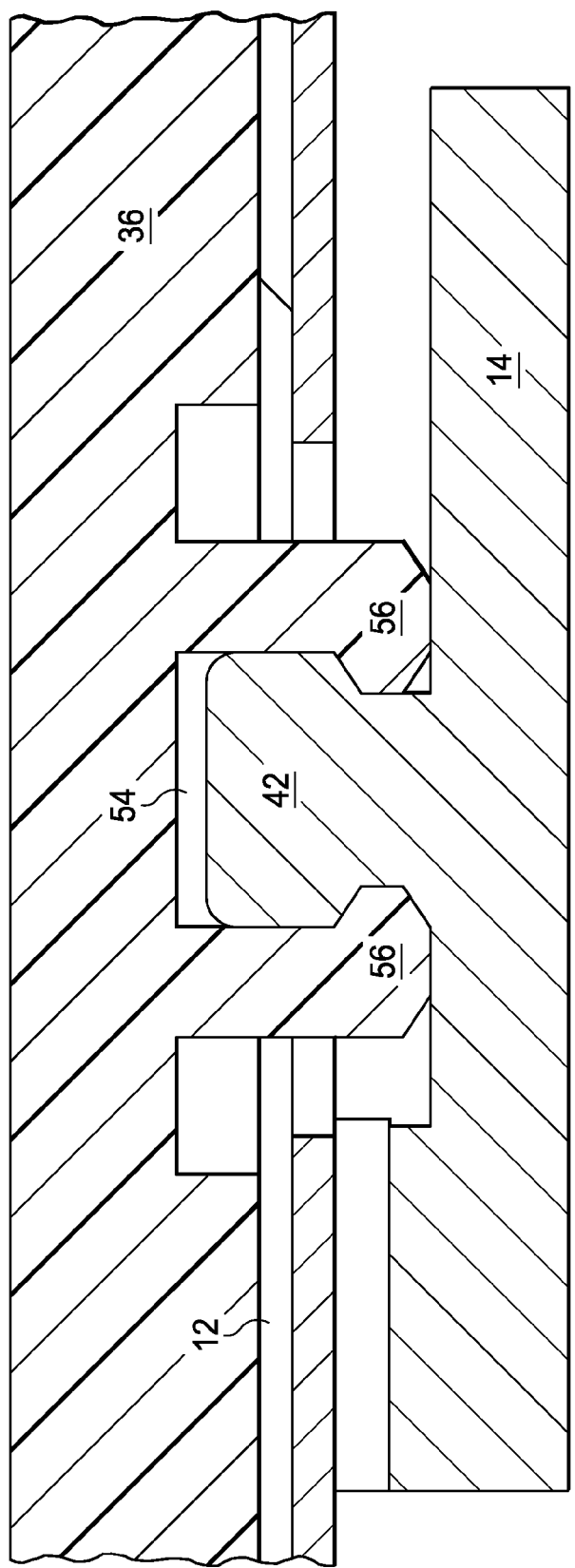
FIG. 5 depicts a side cut away view of a connection post coupled with a lattice cover adapter having snap protrusions.

Referring now to FIG. 5, a side cut away view depicts a connection post 42 coupled with a lattice cover 36, adapter 54 having snap protrusions 56. Connector posts 42 have a mushroom form that fits snuggly in an upper region of an adapter 54. The mushroom head region of connector posts 42 spreads snap protrusions 56 apart during insertion and removal to provide a secure attachment. Connector post 42 is, for example, integrated with the keyboard support surface, such as with a machined or bonded metal extension upwards from the palm rest of the housing 20 upper surface 16. Once lattice cover 36 couples over keyboard 12, openings 60 and screws 40 are covered to provide an aesthetic appearance. To remove the keyboard, the user pulls lattice cover 36 upwards to release the connector post and rim snap connections.

Although the present invention has been described in detail, it should be understood that various changes, substitutions and alterations can be made hereto without departing from the spirit and scope of the invention as defined by the appended claims.

What is claimed is:

1. An information handling system comprising:
   a housing having a top surface forming a keyboard support structure, the keyboard support structure having plural connector posts extending outwards, the connector posts having mushroom-shaped ends;
   a processor disposed in the housing and operable to execute instructions to process information;
   memory disposed in the housing and interfaced with the processor to store the instructions and information;
   a keyboard disposed on the keyboard support structure, the keyboard having openings aligned with the plural connector posts; and
   a cover disposed over the keyboard, the cover having adapters aligned to couple to the connector posts through the keyboard openings, the adapters comprising parallel spaced members that snap over the connector post mushroom-shaped ends.

2. The information handling system of claim 1 further comprising:
   screws coupling the keyboard to the housing;
   wherein the screws insert from the top surface through the keyboard and then into the keyboard support structure and the cover rests over the screws.

3. The system of claim 2 further comprising:
   a rim formed in the housing around the keyboard support structure, the rim having snap connectors; and
   snaps formed in the cover and aligned to couple with the snap connectors.

4. The system of claim 1 wherein the cover comprises a lattice having plural openings aligned to pass through the keys of the keyboard.

5. The system of claim 4 wherein the plural connector openings are evenly spaced along the lattice and only some of the plural connector openings have a connector post passed through.

6. The system of claim 1 wherein the connector posts are formed with metal integrated in a palm rest of the top surface.

7. The system of claim 1 wherein the cover comprises a lattice having plural openings aligned to pass through the keys of the keyboard and plural connector openings disposed in the lattice between the plural openings, each of the plural connector openings sized to pass through a connector post.

8. The system of claim 1 wherein each adapter comprises parallel snap protrusions, at least some of the snap protrusions aligned along a lateral axis of the keyboard and the rest of the snap protrusions aligned along a longitudinal axis.

9. The system of claim 8 further comprising:
   a keyboard cable extending from the keyboard to communicate key inputs made at keys of the keyboard; and
   a keyboard connector configured to accept the keyboard cable, the keyboard connector disposed on a bottom surface of the housing;
   wherein the keyboard cable passes through an opening formed in the upper surface to couple with the keyboard connector disposed on the bottom surface.

10. A method for coupling a keyboard to a portable information handling system, the method comprising:
    placing the keyboard on an upper support surface of an information handling system housing;
    placing a cover over the keyboard, the cover having openings to pass through keys of the keyboard; and
    securing adapters on a bottom surface of the cover with connector posts extending upwards from the upper support surface through openings formed in the keyboard;
    wherein:
    the adapters comprise parallel spaced members; and
    the connector posts comprise mushrooms sized to couple between the parallel spaced members.

11. The method of claim 10 further comprising:
    forming openings in the keyboard size to fit the connector posts; and
    aligning the keyboard with a predetermined position by inserting the connector posts in predetermined of the openings.

12. The method of claim 10 further comprising:
    securing the keyboard to the upper support surface with screws that pass through the keyboard and then into the upper support surface; and
    placing the cover over the screws.

13. The method of claim 10 further comprising:
    forming a rim to define a perimeter of the upper support surface;
    including snap connectors along the perimeter; and
    engaging snaps formed at an outer perimeter of the cover with the snap connectors.

14. The method of claim 10 wherein at least some of the parallel spaced members have a longitudinal alignment and at least some of the parallel spaced members have a lateral alignment.

15. The method of claim 10 further comprising integrating the connector posts with the upper support surface.

16. The method of claim 10 further comprising:
   forming an opening in the upper support surface; and
   passing a keyboard cable through the opening to connect with a keyboard connector located on an upper surface of the motherboard.

17. An information handling system keyboard assembly comprising:
   a keyboard having plural keys on an upper surface to accept end user inputs, the keyboard having plural openings, each opening sized to pass through a connector post having a mushroom-shaped end portion; and
   a lattice cover having plural key openings to pass through the keys of the keyboard and plural adapters extending from a bottom surface, each adapter having parallel spaced members aligned to insert through a keyboard opening and configured to couple with a support surface connector post mushroom-shaped end portion so that the cover bottom surface presses the keyboard against the support surface.

18. The information handling system keyboard assembly of claim 17 further comprising:
   snaps formed in a perimeter of the lattice cover and aligned to engage with the support surface; and
   screws passing through keyboard and into the support surface, the screws hidden by the lattice cover upon placement of the lattice cover over the keyboard.

19. The information handling system keyboard assembly of claim 18 wherein the keyboard keys have a QWERTY configuration.

* * * * *